United States Patent Office 3,551,567
Patented Dec. 29, 1970

---

3,551,567
COMPOSITIONS CONTAINING INDOLYLPYRI-
DINIUM SALTS AND METHOD OF USE
William Joseph Fanshawe, Pearl River, N.Y., and Victor
John Bauer, Montvale, and Sidney Robert Safir, River
Edge, N.J., assignors to American Cyanamid Company,
Stamford, Conn., a corporation of Maine
No Drawing. Filed Aug. 7, 1968, Ser. No. 750,751
Int. Cl. A61k 27/00
U.S. Cl. 424—263
10 Claims

ABSTRACT OF THE DISCLOSURE

Compositions containing indolylpyridinium salts and a method of using these compositions for the lowering of blood glucose levels in warm-blooded animals.

SUMMARY OF THE INVENTION

The new compositions of the present invention contain as the active component compounds of the formula:

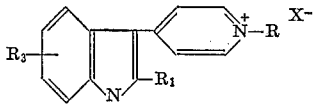

where R is selected from the group consisting of lower alkyl, cycloalkyl(lower)alkyl, lower alkenyl, and lower alkoxy(lower)alkyl; $R_1$ is selected from the group consisting of hydrogen and lower alkyl; $R_2$ is selected from the group consisting of hydrogen, lower alkyl, cycloalkyl (lower)alkyl, lower alkenyl, and lower alkoxy(lower) alkyl; $R_3$ is selected from the group consisting of hydrogen, lower alkyl, lower alkoxy, halogen, and nitro; and X is a pharmaceutically acceptable anion such as, for example, chloride, bromide, iodide, and the like.

In general, the active components are crystalline solids, soluble in water.

The active components of the present invention may be prepared by reaction of a 3-(4-pyridyl)indole with a lower alkyl, lower alkenyl, cycloalkyl(lower)alkyl or lower alkoxy(lower)alkyl halide at a temperature within the range of from about 0 to 150° C. with or without solvent, such as alcohol or acetonitrile, for a period of several minutes to twenty-four hours in an open vessel or a sealed bomb. The time necessary to complete the reaction is dependent upon the temperature and other conditions of the reaction. This reaction can be illustrated schematically by the following equation:

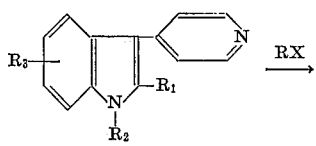

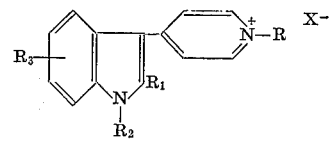

wherein R, $R_1$, $R_2$, $R_3$ and X are as described hereinbefore

Among the compounds of the present invention are, for example:

1-methyl-4-(3-indolyl)pyridinium chloride;
1-ethyl-4-(3-indolyl)pyridinium iodide;
1-cyclopropylmethyl-4-(3-indolyl)pyridinium bromide;
1-allyl-4-(3-indolyl)pyridinium chloride;
1-methallyl-4-(3-indolyl)pyridinium chloride;
1-(2-ethoxyethyl)-4-(3-indolyl)pyridinium chloride;
1-methyl-4-(1-methyl-3-indolyl)-pyridinium chloride;
1-ethyl-4-(1-methyl-3-indolyl)pyridinium iodide;
1-cyclopropylmethyl-4-(1-propyl-3-indolyl)pyridinium
  bromide;
1-allyl-4-(1-butyl-3-indolyl)pyridinium chloride;
1-methallyl-4-(1-methyl-3-indolyl)pyridinium chloride;
1-methyl-4-(1-ethyl-3-indolyl)pyridinium chloride;
1-butyl-4-(1-cyclopropylmethyl-3-indolyl)pyridinium
  iodide;
1-ethyl-4-(1-allyl-3-indolyl)pyridinium chloride;
1-isopropyl-4-(1-methallyl-3-indolyl)pyridinium
  chloride;
1-crotyl-4-(1-ethoxyethyl-3-indolyl)pyridinium chloride;
1-(3-methoxypropyl)-4-(2-methyl-3-indolyl)pyridinium
  chloride;
1-cyclobutylmethyl-4-(3-ethyl-3-indolyl)pyridinium
  iodide;
1-methyl-4-(1,2-dimethyl-3-indolyl)pyridinium chloride;
1-methyl-4-(5-methyl-3-indolyl)pyridinium iodide;
1-allyl-4-(7-methyl-3-indolyl)pyridinium chloride;
1-methyl-4-(1,7-dimethyl-3-indolyl)pyridinium iodide;
1-ethyl-4-(5-methoxy-3-indolyl)pyridinium chloride;
1-methyl-4-(5-methoxy-1-methyl-3-indolyl)pyridinium
  iodide;
1-methallyl-4-(7-methoxy-3-indolyl)pyridinium iodide;
1-methyl-4-(5-nitro-3-indolyl)pyridinium chloride;
1-propyl-4-(6-nitro-3-indolyl)pyridinium iodide;
1-(3-buten-1-yl)-4-(5-bromo-3-indolyl)pyridinium
  chloride;
1-methyl-4-(5-fluoro-3-indolyl)pyridinium iodide.

The compositions of the present invention show hypoglycemic activity which indicates they are useful medicaments in the lowering of blood sugar levels in warm-blooded animals. When the compositions are administered orally to normal mice, a reduction of blood sugar levels is observed. The active compounds of this invention are administered by gavage as saline solutions or aqueous carboxymethyl cellulose suspensions to CF-1 mice (Carworth Farms, 25–30 grams, 4–6 animals). Control animals receive an equivalent volume of vehicle. Food is withheld from animals after dosing. Blood glucose is determined on 0.05 milliliter samples of blood by the method of Hoffman [J. Biol. Chem., 120, 51 (1937)] as adapted to the Technicon Auto-Analyzer® and is expressed as percent change from predose values. These data are summarized in Table I.

TABLE I.—DECREASE IN BLOOD-GLUCOSE IN MICE AFTER ORAL ADMINISTRATION OF 4-(3-INDOLYL)PYRIDINIUM SALTS

| Compound | Dose, mole/kg. | Hours after dosing | Percent decrease in blood-glucose |
|---|---|---|---|
| 1-methyl-4-(3-indolyl)pyridinium chloride | 0.4 | 3 | 59±4 |
| 1-ethyl-4-(3-indolyl)pyridinium iodide | 1.5 | 5 | 55±12 |
| 1-allyl-4-(3-indolyl)pyridinium chloride | 1.5 | 3 | 69±15 |
| 1-methallyl-4-(3-indolyl)pyridinium chloride | 0.5 | 3 | 30±6 |
| 1-(2-ethoxyethyl)-4-(3-indolyl)pyridinium chloride | 1.5 | 3 | 44±13 |
| 1-methyl-4-(1-methyl-3-indolyl)pyridinium chloride | 1.5 | 5 | 32±10 |
| 1-ethyl-4-(1-methyl-3-indolyl)pyridinium iodide | 1.5 | 3 | 51±19 |
| 1-methyl-4-(1-allyl-3-indolyl)pyridinium iodide | 1.5 | 5 | 79±12 |
| 1-methyl-4-(1-cyclopropylmethyl-3-indolyl)pyridinium iodide | 3.0 | 5 | 37±14 |
| 1-methyl-4-[1-(2-ethoxyethyl)-3-indolyl]pyridinium iodide | 1.5 | 3 | 85±4 |
| 1-methyl-4-(7-methyl-3-indolyl)pyridinium iodide | 1.5 | 3 | 63±20 |
| 1-methyl-4-(5-fluoro-3-indolyl)pyridinium iodide | 0.5 | 5 | 37±2 |
| 1-allyl-4-(1-methyl-3-indolyl)pyridinium chloride | 0.5 | 3 | 50±12 |

The above results show that the active components of the present invention are useful in lowering the blood glucose concentration in warm-blooded animals.

The compositions of the present invention may be used to lower blood sugar levels in warm-blooded animals at a dose of from 0.1 milligram to 100 milligrams per kilogram of body weight per day. They may be administered in dosage units of from 5 mg. to 500 mg. per dose. Obviously, the unit dose may be taken in multiples or divided into a smaller dose.

The active components of this invention can be used with pharmaceutically acceptable carriers in compositions such as tablets, wherein the principal active ingredient is mixed with conventional tableting ingredients such as corn starch, lactose, sucrose, sorbitol, talc, stearic acid, magnesium stearate, dicalcium phosphate, gums, and fractionally similar materials as pharmaceutical diluents or carriers. The tablets or pills of the novel compositions can be laminated or otherwise compounded to provide a dosage form affording the advantage of prolonged or delayed action or predetermined successive action of the enclosed medication. For example, the tablet or pill can comprise an inner dosage and an outer dosage component, the latter being in the form of an envelope over the former. The two components can be separated by an enteric layer which serves to resist disintegration in the stomach and permits the inner component to pass intact into the duoderm or to be delayed in release. A variety of materials can be used for such enteric layers or coatings, such materials including a number of polymeric acids or mixtures of polymeric acids with such materials as shellac, shellac and cetyl alcohol, cellulose acetate and the like. A particularly advantageous enteric coating comprises a styrene maleic acid copolymer together with known materials contributing to the enteric properties of the coating. The term dosage form as described herein refers to physically discrete units suitable as unitary dosage for warm-blooded animal subjects, each unit containing a predetermined quantity of active material calculated to produce the desired therapeutic effect in association with the required pharmaceutical diluent, carrier or vehicle. Examples of suitable oral dosage forms in accord with this invention are tablets, capsules, pills, powder packets, granules, wafers, cachets, teaspoonfuls, dropperfuls, ampules, vials, segregated multiples of any of the foregoing and other forms as herein described.

DETAILED DESCRIPTION

The preparation of the active components of the compositions of this invention and useful formulations will be described in greater detail in conjunction with the following examples.

EXAMPLE 1

Preparation of 1-benzoyl-1,4-dihydro-4-(3-indolyl)-pyridine

To a solution of 23.4 g. of indole in 250 ml. of pyridine is added 28.1 g. of benzoyl chloride dropwise with stirring under a nitrogen atmosphere. The solution is stored at room temperature for 1 hour and then acidified with 6 N hydrochloric acid. The aqueous phase is extracted with ether and the combined ether solutions are dried over magnesium sulfate. The ether solution is evaporated to a solid which is recrystallized from isopropyl alcohol to give tan crystals, melting point 123–126° C., dec.

EXAMPLE 2

Preparation of 3-(4-pyridyl)indole

A mixture of 6.0 g. of 1-benzoyl-1,4-dihydro-4-(3-indolylpyridine (Example 1) and 0.3 g. of 10% palladium-on-carbon in 50 ml. of diphenyl ether is heated at 210° C. for 5 hours with stirring under a nitrogen atmosphere. The mixture is filtered and the filter cake is mixed and stirred in 2 N hydrochloric acid. The acid mixture is filtered and the filtrate is made basic with aqueous sodium hydroxide. A precipitate forms and is collected to give cream colored crystals, melting point 214–216° C.

EXAMPLE 3

Preparation of 3-(4-pyridyl)indole

To 2.3 g. of indole is slowly added 7.3 ml. of 3 molar ethereal methyl magnesium bromide. An ether solution of 4-chloropyridine is added and this mixture is heated in a bomb at 160° C. for 20 hours. The residue is treated with aqueous ammonium chloride and the ether phase is removed. The aqueous solution is extracted with chloroform. The combined organic phases are dried over magnesium sulfate and evaporated under reduced pressure to a mixture of brown liquid and crystals. This mixture is partially dissolved in benzene and filtered to collect buff colored crystals, melting point 207–211° C.

EXAMPLE 4

Preparation of 1-methyl-4-(3-indolyl)pyridinium chloride

A mixture of 5.0 g. of 3-(4-pyridyl)indole (Example 2) and 10 ml. of methyl chloride is heated in a bomb at 100° C. for 20 hours. The excess methyl chloride is allowed to evaporate and the solid residue is recrystallized from isopropyl alcohol-hexane to yield pale yellow crystals, melting point 248–251° C., dec.

EXAMPLE 5

Preparation of 1-ethyl-4-(3-indolyl)pyridinium iodide

A stirred mixture of 3.9 g. of 3-(4-pyridyl)indole (Example 2) and 3.1 g. of ethyl iodide in 100 ml. of ethanol is heated under reflux for 2 hours. On cooling the product crystallizes to yield light brown crystals, melting point 242–245° C., dec.

EXAMPLE 6

Preparation of 1-cyclopropylmethyl-4-(3-indolyl)-pyridinium bromide

A mixture of 3.8 g. of 3-(4-pyridyl)indole (Example 2) and 15 ml. of cyclopropylmethyl bromide is heated at 130° C. for 30 minutes. The excess cyclopropylmethyl bromide is evaporated under reduced pressure to give a solid. This solid is partially dissolved in hot water and filtered. The aqueous filtrate is evaporated under reduced pressure to give a yellow solid which is recrystallized from acetonitrile to give yellow crystals, melting point 195–197° C.

EXAMPLE 7

Preparation of 1-allyl-4-(3-indolyl)pyridinium chloride

A mixture of 3.0 g. of 3-(4-pyridyl)indole (Example 2) and 10 ml. of 3-chloropropene is heated in a bomb at 90° C. for 20 hours. The excess 3-chloropropene is allowed to evaporate and the solid residue is recrystallized from isopropyl alcohol-hexane to give yellow crystals, melting point 214–218° C., dec.

EXAMPLE 8

Preparation of 1-methallyl-4-(3-indolyl)pyridinium chloride

A mixture of 3.0 g. of 3-(4-pyridyl)indole (Example 2) and 10 ml. of methallyl chloride is heated in a bomb at 100° C. for 20 hours. The excess methallyl chloride is allowed to evaporate and the solid residue is recrystallized from ethanol-hexane to give yellow crystals, melting point 243–247° C., dec.

EXAMPLE 9

Preparation of 1-(2-ethoxyethyl)-4-(3-indolyl)pyridinium chloride

A mixture of 2.5 g. of 3-(4-pyridyl)indole (Example 2) and 10 ml. of 2-chloroethyl ethyl ether is heated in a bomb at 120° C. for 20 hours. The excess 2-chloroethyl ethyl ether is allowed to evaporate under reduced pressure and the solid residue is recrystallized from isopropyl alcohol-hexane to give yellow crystals, melting point 165–169° C.

EXAMPLE 10

Preparation of 2-methyl-3-(4-pyridyl)indole

To an ether solution of 5.2 g. of 2-methylindole is slowly added 15.0 ml. of 3 molar ethereal methyl magnesium bromide. An ether solution of 4-chloropyridine is added and this mixture is heated in a bomb at 155° C. for 20 hours. The residue is treated with aqueous ammonium chloride and the ether phase is removed. The aqueous solution is extracted with chloroform. The combined organic phases are dried over magnesium sulfate and evaporated under reduced pressure to a brown solid. This solid is recrystallized from acetonitrile to give straw colored crystals, melting point 192–193° C.

EXAMPLE 11

Preparation of 1-methyl-4-(2-methyl-3-indolyl)pyridinium iodide

A mixture of 1.43 g. of 2-methyl-3-(4-pyridyl)indole (Example 10) and 5 ml. of methyl iodide in 30 ml. of ethanol is heated under reflux for 1.0 hour. The reaction is cooled and the solid which forms is collected to give orange crystals, melting point 324–327° C., dec.

EXAMPLE 12

Preparation of 1-methyl-3-(4-pyridyl)indole

To a stirred mixture of 1.25 g. of sodium hydride (55% dispersion in mineral oil) and 4.85 g. of 3-(4-pyridyl)indole (Example 2) in 20 ml. of dimethylformamide is slowly added a solution of 3.5 g. of methyl iodide in 10 ml. of dimethylformamide. The resultant mixture is stirred at room temperature for 16 hours and then poured onto cracked ice. The mixture is filtered to collect a solid. Recrystallization from hexane gives white crystals, melting point 103–106° C.

EXAMPLE 13

Preparation of 1-methyl-4-(1-methyl-3-indolyl)pyridinium chloride

A mixture of 1.2 g. of 1-methyl-3-(4-pyridyl)indole (Example 12) and 5 ml. of methyl chloride is heated in a bomb at 105° C. for 20 hours. The excess methyl chloride is allowed to evaporate and the solid residue is recrystallized from isopropyl alcohol-hexane to give yellow crystals, melting point 274–278° C., dec.

EXAMPLE 14

Preparation of 1-ethyl-4-(1-methyl-3-indolyl)pyridinium iodide

A stirred mixture of 3.0 g. of 1-methyl-3-(4-pyridyl)indole (Example 12) and 2.3 g. of ethyl iodide in 50 ml. of ethanol is heated under reflux for 2 hours. The solution is chilled and filtered to collect light brown crystals, melting point 208–215° C., dec. Recrystallization of these crystals from methanol gives light brown needles, melting point 229–231° C., dec.

EXAMPLE 15

Preparation of 1-allyl-4-(1-methyl-3-indolyl)pyridinium chloride

A mixture of 3.5 g. of 1-methyl-3-(4-pyridyl)indole (Example 12) and 10 ml. of 3-chloropropene is heated in a bomb at 90° C. for 20 hours. The excess 3-chloropropene is distilled and the solid residue is recrystallized from isopropyl alcohol-hexane to give dull yellow crystals, melting point 235–238° C., dec.

EXAMPLE 16

Preparation of 1-cyclopropylmethyl-3-(4-pyridyl)indole

To a stirred mixture of 3.5 g. of sodium hydride (55% dispersion in mineral oil) and 30 ml. of dimethylformamide is slowly added 7.6 g. of 3-(4-pyridyl)indole (Example 2). To this mixture is added 5.4 g. of cyclopropylmethyl bromide in 10 ml. of dimethylformamide dropwise during 15 minutes. The mixture is stored at room temperature for 16 hours and then mixed with cracked ice. The aqueous mixture is acidified with dilute hydrochloric acid, washed with ether and made basic with 5 normal sodium hydroxide. The aqueous mixture is extracted with chloroform. The chloroform solution is dried over magnesium sulfate and evaporated under reduced pressure to afford a mobile, brown liquid. The liquid is distilled at 0.20 mm. and a viscous, light brown liquid is obtained, boiling point 191–195° C.

EXAMPLE 17

Preparation of 1-methyl-4-(1-cyclopropylmethyl-3-indolyl)pyridinium iodide

A solution of 2.0 g. of 1-cyclopropylmethyl-3-(4-pyridyl)indole (Example 16) and 5.0 ml. of methyl iodide in 10 ml. of ethanol is heated under reflux for 1.0 hour. On cooling, a solid forms and is collected and recrystallized from acetonitrile to give yellow crystals, melting point 214–216° C., dec.

EXAMPLE 18

Preparation of 1-allyl-3-(4-pyridyl)indole

To a stirred mixture of 3.5 g. of sodium hydride (55% dispersion in mineral oil) in 30 ml. of dimethylformamide is slowly added 7.6 g. of 3-(4-pyridyl)indole (Example 2). To this mixture is added a solution of 3.1 g. of 3-chloropropene in 10 ml. of dimethylformamide dropwise during 5 minutes. The reaction is stored at room temperature for 16 hours and then mixed with cracked ice. The aqueous mixture is acidified with dilute hydrochloric acid, washed with ether and made basic with 5 normal sodium hydroxide. The aqueous mixture is extracted with chloroform, the chloroform solution is dried over magnesium sulfate and evaporated under reduced pressure to yield a slightly viscous, brown liquid. The liquid is distilled at 0.15 mm. to give a viscous, brown liquid, boiling point 165–178° C.

EXAMPLE 19

Preparation of 1-methyl-4-(1-allyl-3-indolyl) pyridinium iodide

A solution of 1.3 g. of 1-allyl-3-(4-pyridyl)indole (Example 18) and 5.0 ml. of methyl iodide in 25 ml. of ethanol is heated under reflux for 1.0 hour. The reaction solution is cooled and the solid which forms is collected to give yellow crystals, melting point 212–215° C., dec.

EXAMPLE 20

Preparation of 1-(2-ethoxyethyl)-3-(4-pyridyl)indole

To a stirred mixture of 3.5 g. of sodium hydride (55% dispersion in mineral oil) and 30 ml. of dimethylformamide is slowly added 7.6 g. of 3 - (4 - pyridyl)indole (Example 2). To this mixture is added 4.3 g. of 2-chloroethyl ethyl ether in 10 ml. of dimethylformamide dropwise during 5 minutes. The mixture is stored at room temperature for 16 hours and then mixed with cracked ice. The aqueous mixture is acidified with dilute hydrochloric acid, washed with ether and made basic with 5 normal sodium hydroxide. The basic mixture is extracted with chloroform. The chloroform solution is dried over magnesium sulfate and evaporated under reduced pressure to afford a mobile, light brown liquid. This liquid is distilled at 0.10 mm. to give a viscous, light brown liquid, boiling point 185–205° C.

EXAMPLE 21

Preparation of 1-methyl-4-[1-(2-ethoxyethyl)-3-indolyl] pyridinium iodide

A solution of 2.0 g. of 1-(2-ethoxyethyl)-3-(4-pyridyl) indole (Example 20) and 5.0 ml. of methyl iodide in 10 ml. of ethanol is heated under reflux for 1.0 hour. The mixture is filtered and the filtrate is evaporated under reduced pressure to give a brown solid. The solid is recrystallized from ethanol to give light brown crystals, melting point 141–145° C.

EXAMPLE 22

Preparation of 7-methyl-3-(4-pyridyl)indole

To an ether solution (5.0 ml.) of 5.2 g. of 7-methylindole is slowly added 15.0 ml. of 3 molar ethereal methyl magnesium bromide. An ether solution of 4-chloropyridine is added and this mixture is heated in a bomb at 160° C. for 20 hours. The residue is treated with aqueous ammonium chloride and the ether phase is removed. The aqueous solution is extracted with chloroform. The combined organic phases are dried over magnesium sulfate and evaporated under reduced pressure to a brown liquid. Benzene is added to this liquid and a solid precipitates. The solid is collected and recrystallized from acetone to give cream colored crystals, melting point 221–223° C., dec.

EXAMPLE 23

Preparation of 1-methyl-4-(7-methyl-3-indolyl)pyridinium iodide

An ethanol solution (25 ml.) of 0.296 g. of 7-methyl-3-(4-pyridyl)indole (Example 22) and 1.0 ml. of methyl iodide is heated under reflux for 1.0 hour. The solution is evaporated under reduced pressure to yield a tacky orange solid. This solid is recrystallized from ethanol to give pale orange crystals, melting point 249–251° C., dec.

EXAMPLE 24

Preparation of 5-methoxy-3-(4-pyridyl)indole

To 5.8 g. of 5-methoxyindole is slowly added 15.0 ml. of 3 molar methyl magnesium bromide. An ether solution of 4-chloropyridine is added and this mixture is heated in a bomb at 160° C. for 20 hours. The residue is treated with aqueous ammonium chloride and the ether phase is removed. The aqueous solution is extracted with chloroform. The combined organic phases are dried over magnesium sulfate and evaporated under reduced pressure to a brown liquid. The liquid is chromatographed on alumina to give a brown, oily solid. This solid is sublimed at 0.05 mm. by heating to 140° C. to give a yellow solid, melting point 30–35° C. The yellow solid forms a picrate salt as orange crystals, melting point 244–247° C., dec.

EXAMPLE 25

Preparation of 1-methyl-4-(5-methoxy-3-indolyl) pyridinium chloride

A mixture of 0.347 g. of 5-methoxy-3-(4-pyridyl)indole (Example 24) and 5 ml. of methyl chloride is heated in a bomb at 90° C. for 20 hours. The excess methyl chloride is allowed to evaporate and the residue is dissolved in hot isopropyl alcohol and filtered. Hexane is added to the filtrate and the product is precipitated as buff colored crystals, melting point 156–161° C., dec.

EXAMPLE 26

Preparation of 4-pyridylacetone p-nitrophenylhydrazone

To a stirred solution of 1.9 g. of p-nitrophenylhydrazine hydrochloride in 25 ml. of water is added 1.35 g. of 4-pyridylacetone. A yellow solid separates, is collected, and is stirred with saturated aqueous sodium bicarbonate. The mixture is filtered, and the solid is recrystallized from ethanol to provide yellow needles, melting point 219–220° C., dec.

EXAMPLE 27

Preparation of 2-methyl-5-nitro-3-(4-pyridyl)indole

A mixture of 4-pyridylacetone p-nitrophenylhydrazone and polyphosphoric acid is heated for 1 hour, quenched with water, and neutralized with sodium carbonate. The solid which separates is collected and recrystallized.

EXAMPLE 28

Preparation of 1-methyl-4-(2-methyl-5-nitro-3-indolyl) pyridinium iodide

Following the procedure of Example 23 and substituting 2-methyl-5-nitro-3-(4-pyridyl)indole for 7-methyl-3-(4-pyridyl)indole the produce of the example is obtained.

EXAMPLE 29

Preparation of 5-fluoro-3-(4-pyridyl)indole

To a mixture of 4.4 g. of 5-fluoroindole and 5.0 ml. of ether is slowly added 12.0 ml. of 3 molar methyl magnesium bromide. An ether solution of 4-chloropyridine is added and the mixture is heated in a bomb at 160° C. for 16 hours. The residue is treated with aqueous ammonium chloride and the ether phase is removed. The aqueous solution is extracted with chloroform. The combined organic phases are dried over magnesium sulfate and evaporated under reduced pressure to yield a tacky brown solid. This solid is partially dissolved in benzene and filtered to collect crystals which are recrystallized from chloroform to give off-white crystals, melting point 200–201° C., dec.

EXAMPLE 30

Preparation of 1-methyl-4-(5-fluoro-3-indolyl) pyridinium iodide

A solution of 0.867 g. of 5-fluoro-3-(4-pyridyl)indole (Example 29) and 2.0 ml. of methyl iodide in 40 ml. of ethanol is heated under reflux for 1.0 hour. The reaction is cooled and filtered to collect yellow crystals, melting point 315–317° C., dec.

EXAMPLE 31

1-methyl-4-(3-indolyl)pyridinium chloride—5 g.
Sodium carboxymethylcellulose—5%
Aqueous solution q.s.—100 cc.

The above solution contains approximately 5 mmole per cc.

EXAMPLE 32

The present compounds can be dispensed in dosage unit forms such as hard shell capsules or soft shell capsules. A formulation found useful in the preparation of such capsules is as follows:

|  | Grams |
|---|---|
| 1-ethyl-4-(3-indolyl)pyridinium chloride | 2.0 |
| Lactose, U.S.P. | 300 |
| Magnesium stearate (0.5%) | 3.125 |
|  | 305.125 |

The formulation is thoroughly mixed and placed as equal quantities in 100 capsules.

EXAMPLE 33

The following example represents a formulation useful in preparing tablets. Larger tablets can be scored and divided into halves or quantities to be given more often. Obviously, also smaller tablets can be used in multiple doses to obtain the daily amount of active material. The following formulation has been useful.

|  | G. |
|---|---|
| 1-methyl-4-(1-methyl-3-indolyl)pyridinium chloride | 5.0 |
| Corn starch | 21.0 |
| Methyl cellulose 400 | 35.0 |
| Magnesium stearate 1% | 18.2 |
| Total | 79.2 |

Make into 100 tablets. Each of the above tablets contains 50 mg. of drug.

EXAMPLE 34

The compounds of the present invention can also be given in the form of tablets containing other formulations as follows:

|  | Grams |
|---|---|
| 1-methyl-4-(3-indolyl)pyridinium chloride | 50.0 |
| Corn starch | 300.0 |
| Ethyl cellulose N 10 | 5 |
| Magnesium stearate 1% | 1.6 |
| Total | 356.6 |

Make into 1000 tablets.

The above formulation can be varied by increasing or decreasing the corn starch and by the addition of other ingredients. Also, other disintegrating agents, such as potato starch, may be used in place of corn starch. Other lubricants such as stearic acid, talc and the like can be used. Sweetening agents such as saccharin or sodium cyclohexyl sulfamate and flavoring such as peppermint oil, oil of wintergreen, orange or cherry can be used.

We claim:

1. The method of lowering blood glucose levels in warm-blooded animals which comprises orally administering to said animals a blood glucose lowering amount of a pyridinium salt of the formula:

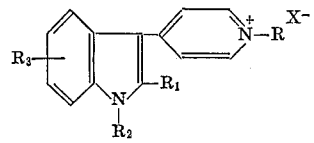

wherein R is selected from the group consisting of lower alkyl, cyclopropylmethyl lower alkenyl, and lower alkoxy(lower)alkyl; $R_1$ is selected from the group consisting of hydrogen and lower alkyl; $R_2$ is selected from the group consisting of hydrogen, lower alkyl, cyclopropylmethyl, lower alkenyl, and lower alkoxy(lower)alkyl; $R_3$ is selected from the group consisting of hydrogen, lower alkyl, lower alkoxy, fluoro and nitro; and X is a pharmaceutically acceptable anion.

2. The method according to claim 1, in which the pyridinium salt is: 1 - (2 - ethoxyethyl)-4-(3-indolyl)pyridinium chloride.

3. The method according to claim 1, in which the pyridinium salt is: 1 - methyl-4-(3-indolyl)pyridinium chloride.

4. The method according to claim 1, in which the pyridinium salt is: 1 - ethyl - 4 - (3 - indolyl)pryidinium iodide.

5. The method according to claim 1, in which the pyridinium salt is: 1-allyl-4-(3-indolyl)pyridinium chloride.

6. The method according to claim 1, in which the pyridinium salt is: 1-methallyl-4-(3-indolyl)pyridinium chloride.

7. The method according to claim 1, in which the pyridinium salt is: 1-(2-ethoxyethyl)-4-(3-indolyl)pyridinium chloride.

8. The method according to claim 1, in which the pyridinium salt is: 1-ethyl-4-(1-methyl-3-indolyl)pyridinium iodide.

9. The method according to claim 1, in which the pyridinium salt is: 1-methyl - 4 - (7-methyl-3-indolyl)pyridinium iodide.

10. An oral composition for lowering blood glucose levels in warm-blooded animals which comprises a pharmaceutically acceptable carrier and from 0.1 milligram to 100 milligrams per kilogram of body weight of a pyridinium salt of the formula:

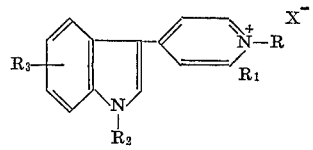

wherein R is selected from the group consisting of lower alkyl, cyclopropylmethyl, lower alkenyl, and lower alkoxy(lower)alkyl; $R_1$ is selected from the group consisting of hydrogen and lower alkyl; $R_2$ is selected from the group consisting of hydrogen, lower alkyl, cyclopropylmethyl, lower alkenyl, and lower alkoxy(lower)alkyl; $R_3$ is selected from the group consisting of hydrogen, lower alkyl, lower alkoxy, fluoro and nitro; and X is a pharmaceutically acceptable anion.

References Cited

UNITED STATES PATENTS

| 3,075,986 | 1/1963 | Jacob et al. | 260—296B |
| 3,361,759 | 1/1968 | Anthony et al. | 424—263 |

JEROME D. GOLDBERG, Primary Examiner